United States Patent [19]
Pike et al.

[11] Patent Number: 6,003,814
[45] Date of Patent: Dec. 21, 1999

[54] DOUBLE-WALLED DUCT ASSEMBLY FOR AIRCRAFT ANTI-ICING CONDUIT SYSTEMS

[75] Inventors: Walter E. Pike, Castaic; Jan C. Shafer, Thousand Oaks, both of Calif.

[73] Assignee: Seniors Flexonics Inc. Stainless Steel Products Division, Burbank, Calif.

[21] Appl. No.: 08/668,434

[22] Filed: Jun. 17, 1996

[51] Int. Cl.⁶ ................................................ B64D 15/04
[52] U.S. Cl. .................................. 244/134 B; 239/587.1; 285/300; 285/302
[58] Field of Search ........................ 244/134 A, 134 B, 244/214; 138/149, 120; 239/587.1, 587.2, 587.5, DIG. 4; 285/300, 302

[56] References Cited

U.S. PATENT DOCUMENTS

| | | | |
|---|---|---|---|
| 1,513,315 | 10/1924 | Cook ........................................ | 285/302 |
| 3,495,630 | 2/1970 | Hansen et al. ........................... | 138/149 |
| 4,543,677 | 10/1985 | Haglund et al. ......................... | 138/120 X |
| 4,615,499 | 10/1986 | Knowler ................................. | 244/214 X |
| 4,652,020 | 3/1987 | Gilroy ..................................... | 138/149 X |
| 4,674,714 | 6/1987 | Cole et al. ............................. | 244/134 B |
| 4,757,963 | 7/1988 | Cole ....................................... | 244/134 B |
| 5,400,984 | 3/1995 | Arnold et al. .......................... | 244/134 B |

*Primary Examiner*—William Grant
*Attorney, Agent, or Firm*—Dick and Harris

[57] ABSTRACT

Disclosed is a duct assembly for conducting compressed air from a fixed component to a component that is movable with respect to the fixed component. The duct assembly contains at least two telescoping, tubular conduit sections with seals between adjacent sections. An upstream transitional joint rotatably interconnects the outermost conduit section with an air supply duct, while a downstream transitional joint rotatably interconnects the innermost conduit section with an air delivery duct. A tubular double-wall spaced apart from the inner surface of the innermost conduit section forms an annular airspace between the tubular double-wall and the innermost conduit section. A second double-wall forms a second annular airspace between its downstream end and the upstream transitional joint. The annular airspaces created by the double-walls protect the seals.

26 Claims, 5 Drawing Sheets

DOUBLE-WALLED DUCT ASSEMBLY FOR AIRCRAFT ANTI-ICING CONDUIT SYSTEMS

BACKGROUND OF THE INVENTION

1. Field of the Invention

This invention relates to the mechanical arts. In particular, it relates to a duct assembly for use in aircraft anti-icing conduit systems.

2. Discussion of the Related Art

As is well-known, jet aircraft engines provide the thrust needed to propel jet aircraft. Additionally, by redirecting a portion of the compressed, bleed air produced by the engines through a conduit system, the air can be used for a variety of other purposes. These other purposes include pressurizing, heating, and cooling the aircraft's cabin, and removing moisture from its front windows. To be effective, the conduit system must not only minimize the escape of the bleed air, but it must withstand the elevated temperatures, often in excess of 650° F., of the bleed air produced by today's jet aircraft.

Another important use for the bleed air is to de-ice the aircraft wings' leading edges, wing slats, and elevons. For example, to de-ice the movable slats located on the leading edge of the aircraft wings, hot, compressed, bleed air is transferred through conduit sections from a supply duct running lengthwise in the wings' leading edge to a spray duct running lengthwise in the wings' slats. The spray duct has openings to deliver the bleed air to the interior surface of the slats.

Special considerations are involved in the anti-icing conduit systems used to de-ice movable portions of the aircraft, such as wing slats and elevons, that must undergo a wide range of motions as they are extended and then retracted. In order to track the movement of these components, the conduit system must contain slidable and rotatable conduit sections. Conventional duct assemblies are formed from metallic, tubular, telescoping conduit sections. To maintain the air pressure within the assembly, each conduit section is sealed with an elastomeric seal. Special, high temperature-resistant elastomeric compositions have been developed for the manufacture of such seals. Nonetheless, the seals still become unstable and their performance over time suffers, when they are exposed to extended or to relatively direct contact by the stream of hot, compressed, bleed air.

Accordingly, there has existed a definite need for an improved duct assembly which not only minimizes the escape of compressed air, but is stable for prolonged periods of time at high temperatures. The present invention satisfies these and other needs and provides further related advantages.

SUMMARY OF THE INVENTION

Now in accordance with the invention there has been found an improved, pressurized, duct assembly for conducting compressed air from a fixed component to a component that is movable with respect to the fixed component. The duct assembly conducts air from a fixed means for supplying the air, associated with the fixed component, to a means for delivering the air, movable along with the movable component. In preferred embodiments, the slidable duct assembly interconnects an air supply duct running lengthwise in a fixed portion of an aircraft wing to a spray duct running lengthwise in a movable wing slat or elevon.

The duct assembly contains at least two telescoping, tubular conduit sections, including an innermost conduit section and an outermost conduit section. Each conduit section has an inner surface and an outer surface. An upstream transitional joint forms a substantially gas-tight seal with the outermost conduit section and rotatably interconnects the outermost conduit section with the air supply means, while a downstream transitional joint forms a substantially gas-tight seal with the innermost conduit section and rotatably interconnects the innermost conduit section with the air delivery means.

A tubular double-wall spaced apart from the inner surface of the innermost conduit section forms a first annular airspace between the tubular double-wall and the inner surface of the innermost conduit section. In preferred embodiments, the tubular double-wall extends substantially the entire length of the innermost conduit section. A second double-wall forms an inner channel having an upstream end and a downstream end. The inner channel is spaced apart from the inner surface of the upstream transitional joint and forms a second annular airspace between the downstream end and the inner surface of the upstream transitional joint. In some embodiments, the cross-section of the downstream end is of substantially the same size and shape as the cross-section of the tubular double-wall and, preferably, the downstream end is aligned with the tubular double-wall, thus creating a substantially smooth surface for the flow of air through the assembly when the conduit sections are retracted.

A seal disposed between each pair of adjacent conduit sections substantially prevents the escape of air from the pressurized duct assembly. The seal located between the innermost conduit section and the conduit section adjacent the innermost conduit section is positioned so that it lies opposite the first annular airspace at all times. The seal located between the outermost conduit section and the conduit section adjacent the outermost conduit section is positioned so that it lies opposite the second annular airspace when the conduit sections are retracted. The annular airspaces created by the double-walls insulate the seals from the full affect of the hot, bleed air, thus prolonging the lifetime of the duct assembly, while minimizing the escape of air.

DETAILED DESCRIPTION OF THE PREFERRED EMBODIMENTS

To exemplify the inventive, pressurized, duct assembly, the following description may concentrate primarily on the de-icing of wing slats located on the leading edge of an aircraft wing. It should be readily apparent to the skilled artisan that the description with little or no modification might also apply to de-icing other movable components, such as the elevons found on the wing's tailing edge.

Figure 1:
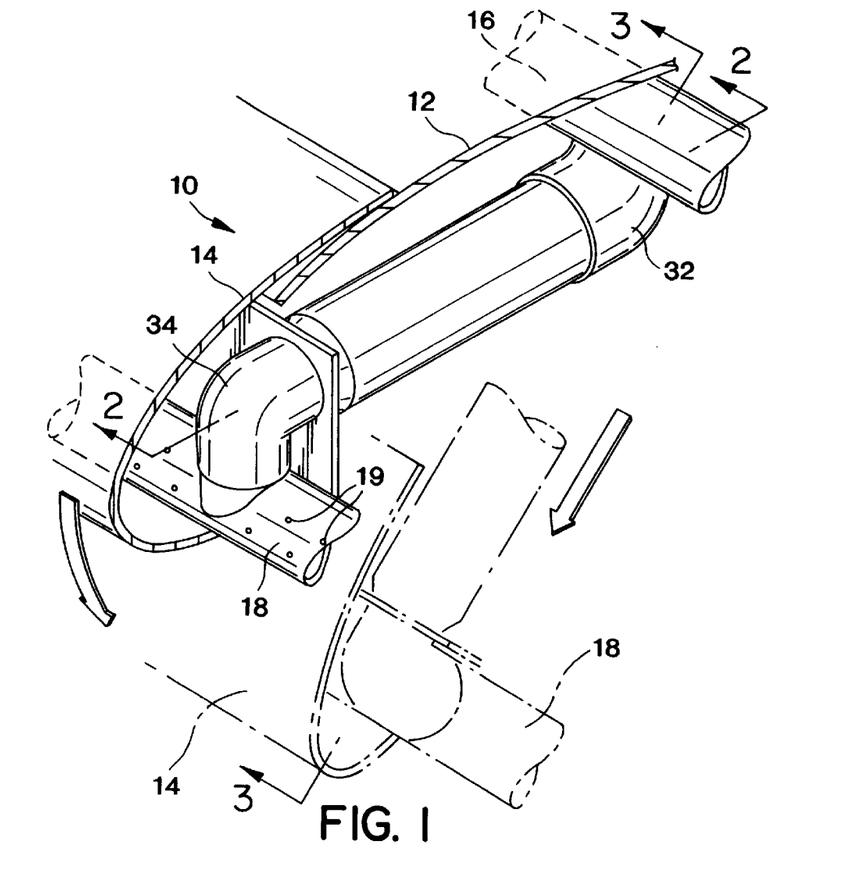
FIG. 1 is a simplified, cross-sectional view of the leading edge of an aircraft wing having a movable slat and a slidable duct assembly in accordance with the invention, the view showing the slat retracted, and by a broken line the slat extended.

FIG. 1 represents a cross-sectional view of a portion of a leading edge 10 of an airplane wing. The figure has been simplified to help in understanding the conduit system in accordance with the invention. Shown is a fixed portion 12 and a movable wing slat 14. The wing slat is normally retracted to nest against the wing's leading edge when in high-altitude flight and is deployed by a suitable actuator (not shown) into the illustrated broken-line position for take-offs and landings. Hot, compressed, bleed air is conducted from the aircraft engine (not shown) to a suitable transfer point on the wing's leading edge by a supply duct 16 running lengthwise in the wing's leading edge. From the supply duct, the bleed air is conducted to a spray duct 18 running lengthwise in the wing slats. Openings 19 deliver the bleed air to the interior surface of the wing slats.

Figure 2:
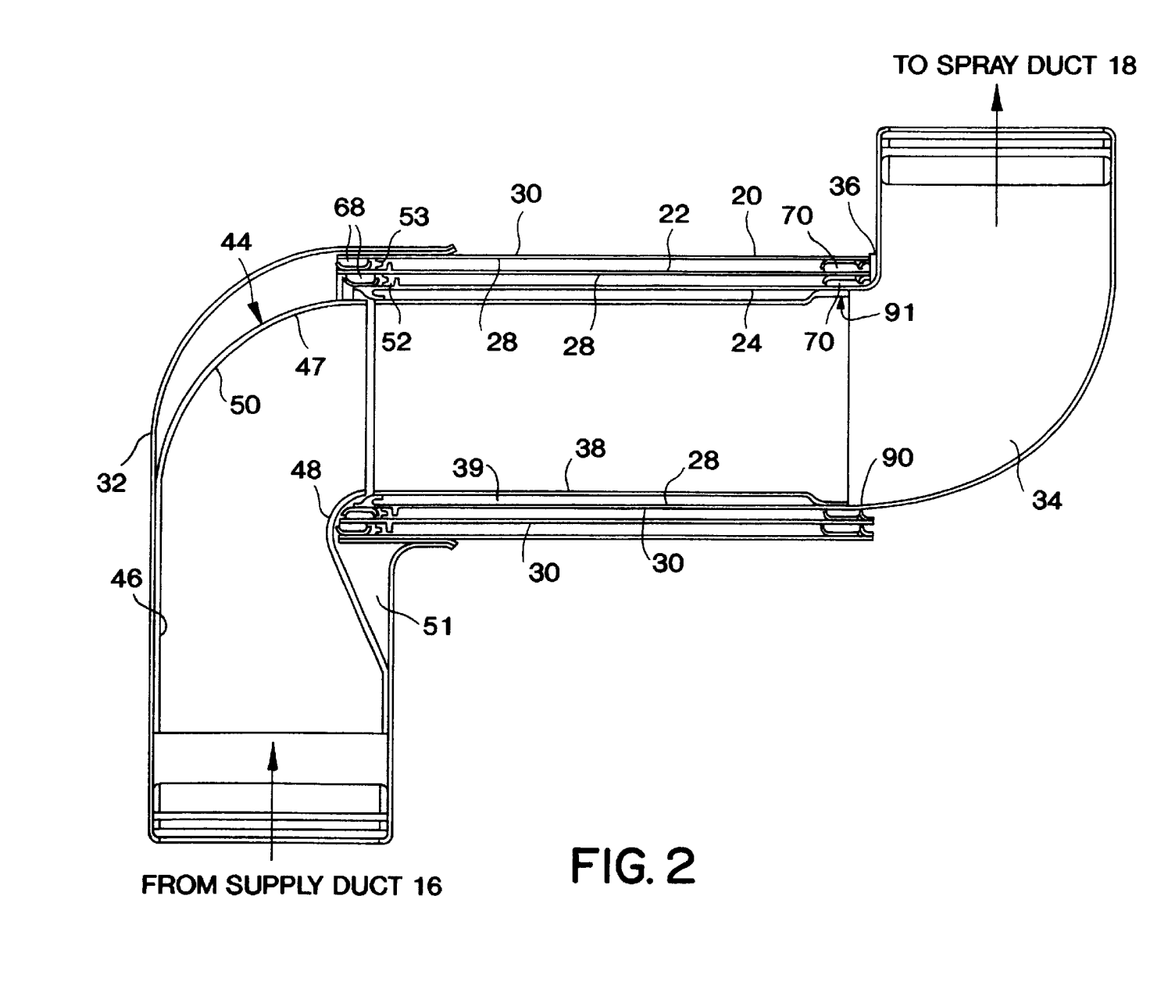
FIG. 2 is a cross-sectional view of the duct assembly shown in FIG. 1 when the duct assembly is retracted.
Figure 3:
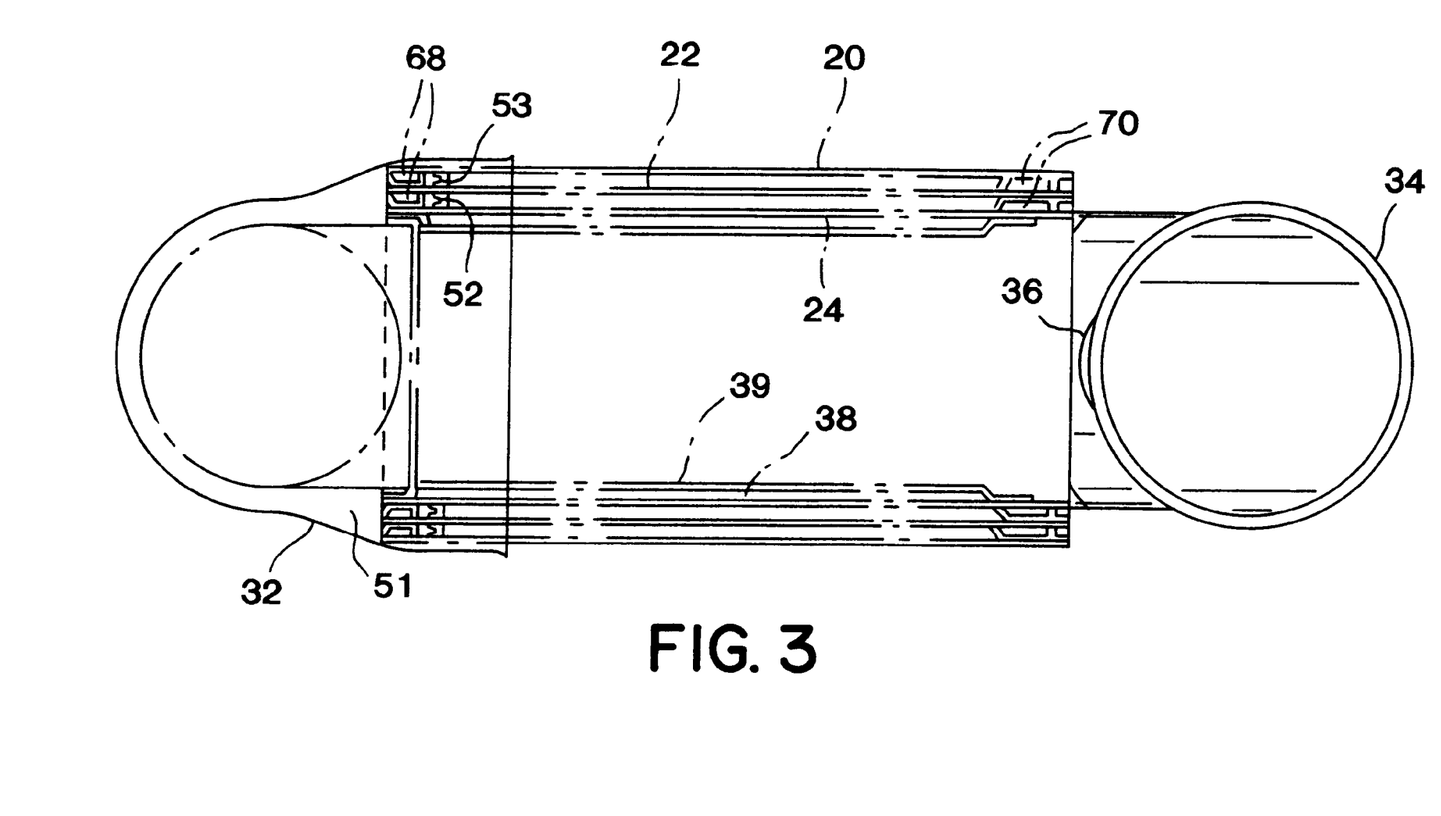
FIG. 3 is a top plan view of the slidable duct assembly shown in FIG. 2 with the inner telescoping duct sections shown in phantom.
Figure 4:
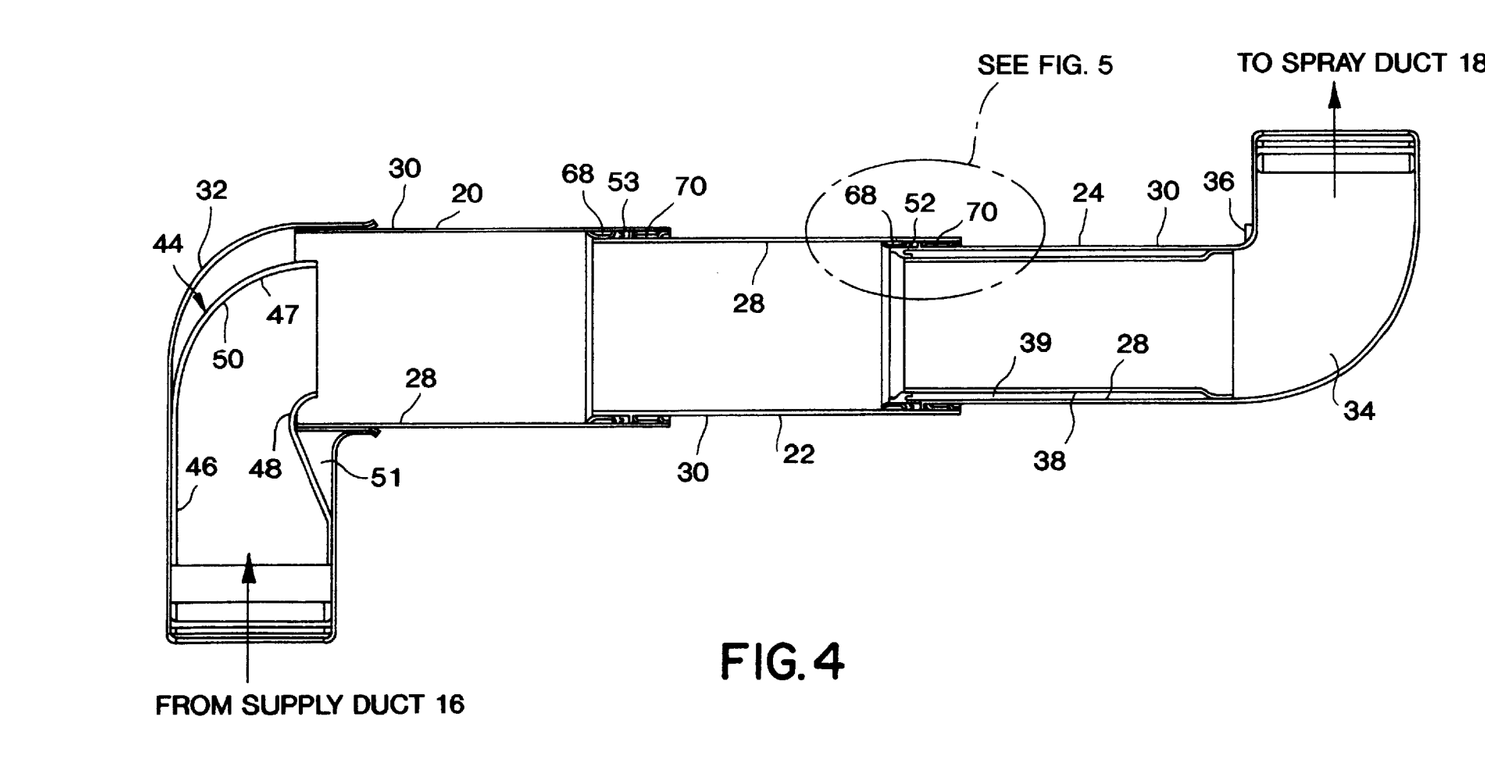
FIG. 4 is a cross-sectional view of the slidable duct assembly shown in FIG. 1 when the duct assembly is extended.

As shown in FIGS. 2–4, the bleed air is conducted by way of a plurality of metallic, telescoping, tubular conduit sections 20, 22 and 24, including an outermost conduit section 20 and an innermost conduit section 24. The tubular conduit sections are used to telescope the duct assembly to the length required for full deployment of the wing slat. Each conduit section has an inner surface 28 and an outer surface 30, so that for each pair of adjacent conduit sections, the outer section's inner surface opposes the inner section's outer surface.

In addition to the telescopic lengthening and shortening of the conduit sections, extension and retraction of the wing slat 14 requires rotation of the conduit sections about the axis of the supply duct 16 and about the axis of the spray duct 18. To this end, an elbow-shaped upstream transitional joint 32 forms a substantially gas-tight seal with the outermost conduit section 20 and rotatably interconnects the supply duct. Similarly, an elbow-shaped downstream transitional joint 34 forms a substantially gas-tight seal with the innermost conduit section 24 and rotatably interconnects the spray duct. A compression stop 36, resistance welded to the downstream joint helps to axially position the conduit sections when the duct assembly is fully retracted.

A tubular double-wall 38 spaced apart from the innermost conduit section 24 extends substantially the entire length of the conduit section to create an annular airspace 39. A second double wall forms an elbow-shaped inner channel 44. The inner channel has an upstream leg 46 leading to a downstream leg 47 formed with a small radius curve segment 48 and a large radius curve segment 50. The upstream leg is welded to the upstream transitional joint 32. The small radius curve segment is inwardly tapered and the large radius curve portion is made elliptical, so that the downstream leg is spaced apart from the inner surface of the upstream traditional joint, creating a second annular airspace 51. The size and shape of the cross-section throughout the downstream leg is substantially the same as the cross section of the tubular double-wall 38 of the innermost duct section 24. As best seen in FIG. 2, when the wing slat is retracted, the downstream leg 44 is aligned with the tubular double-wall 38 and together they create a substantially smooth surface providing good aerodynamics for the flow of air through the assembly when the duct sections are retracted.

Transitional joint 34 includes upstream end 90. Tubular double-wall 38 includes downstream dimension 91.

The pressurized assembly is made substantially air-tight by sealing the opposing inner and outer surfaces 28 and 30 on each of the adjacent conduit sections with a seal disposed between the upstream and downstream slide bearings 32 and 34. An innermost seal 52 located between the innermost conduit section 24 and the adjacent conduit section 22 is positioned opposite the annular airspace 39. An outermost seal 53 located between the outermost conduit section 20 and the adjacent conduit section 22 is positioned opposite the annular airspace 51 when the conduit sections are retracted.

Figure 5:
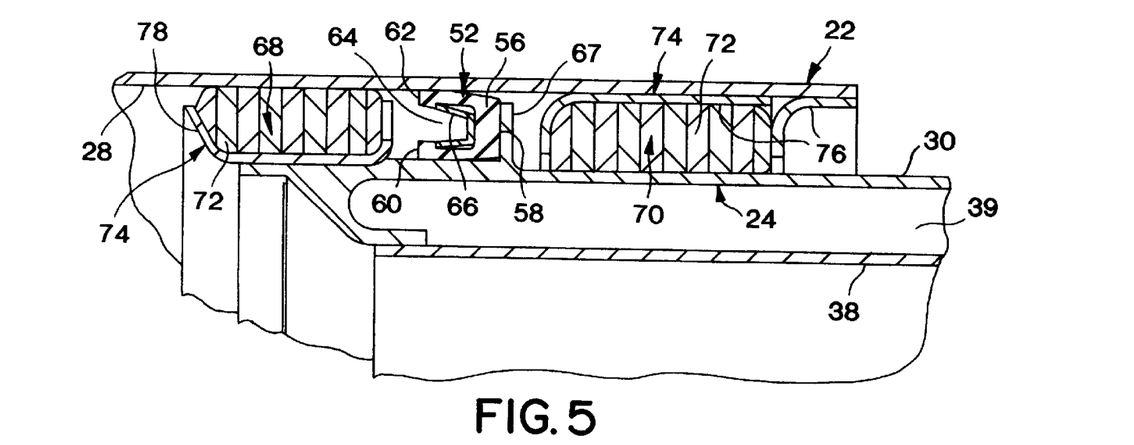
FIG. 5 is an enlarged view of a portion of FIG. 4 detailing the slide bearings and seals.

Turning to FIG. 5, it can be seen that the seals are formed of a resilient, annular seal ring 56 having a base 58 and, extending in an outward direction from the base, inner and outer lips 60 and 62, respectively. The seal rings are preferably made of a high temperature-resistant fluorocarbon material, most preferably a plastic reinforced polyethylene-tetrafluoride material to provide superior heat and wear resistance. The seal ring forms a pressure energized, gas pocket 64 that is reinforced and further energized by a V- or U-shaped stainless steel spring 66. A flange 67 extending radially from each outer surface abuts the upstream base and secures the seal longitudinally.

Located on each side of seals 52 and 53, between each pair of opposing inner and outer surfaces 28 and 30, are an upstream annular slide bearing 68 and a downstream annular slide bearing 70. The slide bearings are attached at the ends of the conduit sections to maximize the stiffness of the duct assembly in all positions. To allow extension and retraction of the duct conduit sections, the upstream slide bearing is affixed to the outer surface of the innermost conduit section for each pair of opposing inner and outer conduit section surfaces. The upstream bearing slidably engages and presses outward against the opposing inner surface, thus permitting relative movement between the upstream slide bearing and the outermost duct section. The downstream slide bearing is affixed to the inner surface of the outermost conduit section for each such pair of conduit sections. The downstream slide bearing slidably engages and presses inward against the opposing outer surface to permit relative movement between the downstream slide bearing and the innermost conduit section.

Each slide bearing is formed of an annular slide bearing ring 72 longitudinally affixed in an annular retainer 74. The slide bearing ring 72 is made of a suitable material having a low coefficient of friction and capable of withstanding the extreme temperature variations likely to be encountered during flight. In the embodiments shown in FIG. 5, the retainer for the downstream slide bearing ring is constructed from two radially-extending L-shaped members 76 fusion or resistance welded to the inner surface 28 of conduit section 22. The retainer for the upstream side bearing ring is constructed from a single U-shaped member fusion or resistance welded to the outer surface 30 of conduit section 24. The upstream leg 78 of the U-shaped member is outwardly tapered. As best seen in FIG. 4, the taper improves the aerodynamics of the flow of bleed air, as the bleed air passes from one telescoping duct, to an adjacent, telescoping duct of a smaller diameter.

To maximize the effectiveness of the slide bearings 68 and 70 in stabilizing the seals 52 and 53, as well as to maximize the extensibility of each conduit section, each seal is placed immediately adjacent a slide bearing. Furthermore, by placing the seal immediately adjacent the upstream slide bearing 68, the seal is protected from direct impingement by the hot bleed air.

The flanges 67 are located so that they act as a stop for the downstream slide bearings 70 and help to position conduit sections 20, 22 and 24 when the duct assembly is fully extended (FIG. 4). This is particularly advantageous in embodiments containing more than two telescoping sections, because the flanges, along with compression stop 36, operate as a series of interelated stops assuring that the middle conduit section 22 is deployed during extension and retraction and properly positioned when the assembly is retracted.

In operation, the annular airspaces 39 and 51 fills with relatively stagnant bleed air that insulates the adjacent seal and bearings from direct flow of bleed air. Furthermore, when the assembly is retracted, the inner channel 44 directs the bleed air away from the upstream seal and bearings.

Figure 6:
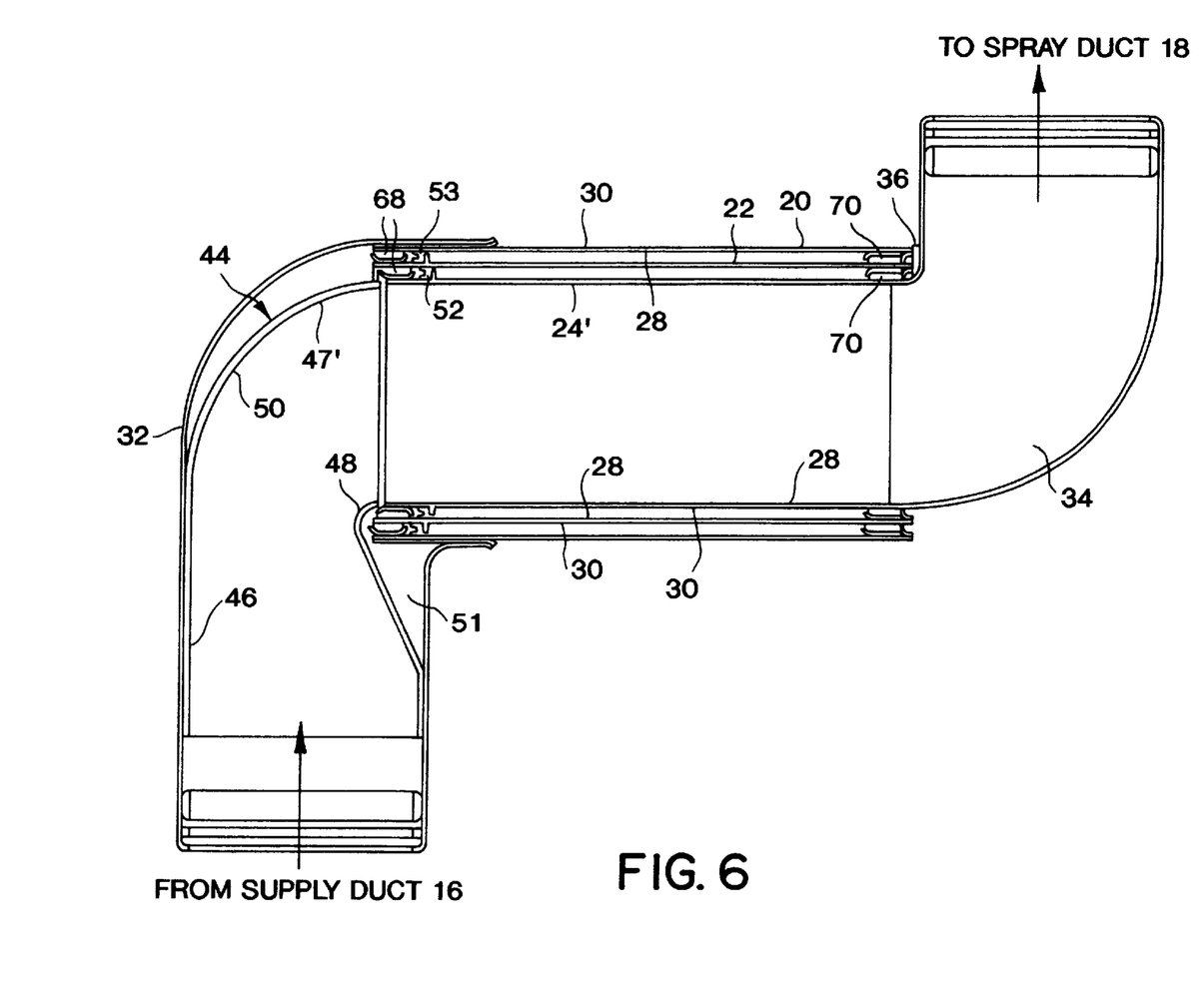
FIG. 6 is a cross-sectional view of another embodiment of a slidable duct assembly in accordance with the invention.

Another embodiment of a slidable duct assembly in accordance with the invention is shown in FIG. 6. In this embodiment, there is no tubular double-wall. Instead, the size and shape of the cross-section throughout the downstream leg 47' is substantially the same as the size and shape of the cross-section of the innermost conduit section 24'. When the wing slat is retracted, the downstream leg is aligned with the innermost conduit section to create a substantially smooth surface.

While the invention has been described in detail with reference to certain preferred embodiments thereof, it will be understood that modifications and variations are within the spirit and scope of that which is described and claimed.

That which is claimed is:

1. A duct assembly for conducting air from a fixed component to a component that is movable with respect to the fixed component, comprising:
   at least two telescoping, tubular conduit sections, including an innermost conduit section and an outermost conduit section, for conduction air from a fixed means for supplying air, through the conduit sections, to a movable air delivery means, each conduit section having an inner surface and an outer surface;
   a tubular double-wall spaced apart from the inner surface of the innermost conduit section, the tubular double-wall forming an annular airspace between the tubular double-wall and the inner surface of the innermost conduit section; and
   a seal disposed between each pair of adjacent conduit sections to substantially prevent the escape of air from the duct assembly, including an innermost seal disposed between the innermost conduit section and the conduit section adjacent the innermost conduit section, the innermost seal positioned opposite the annular airspace; and
   at least one flow facilitating member, operably disposed on at least one of the conduit sections, for prompting the conducting of air from at least one of the conduit sections to a desired successive one of the conduit sections,
   the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

2. The duct assembly in accordance with claim 1 wherein the tubular double-wall extends substantially the entire length of the innermost conduit section.

3. The duct assembly in accordance with claim 1 further comprising an upstream slide bearing and a spaced-apart downstream slide bearing disposed between each pair of adjacent conduit sections, one slide bearing located on each side of the seal.

4. The duct assembly in accordance with claim 3 wherein the seal is positioned adjacent the upstream slide bearing.

5. A duct assembly for conducting air from a fixed component to a component that is movable with respect to the fixed component movable along with the movable component comprising:
   at least two telescoping, tubular conduit sections, including an innermost conduit section and an outermost conduit section, movable between an extended position and a retracted position, each conduit section having an inner surface and an outer surface;
   an upstream transitional joint forming a substantially gas-tight seal with the outermost conduit section and movably interconnecting the outermost conduit section with a means for supplying air;
   a downstream transitional joint forming a substantially gas-tight seal with the innermost conduit section and movably interconnecting the innermost conduit section with a means for delivering air, each transitional joint having an inner surface and an outer surface;
   an inner channel having an upstream end and a downstream end, the downstream end spaced apart from the inner surface of the upstream transitional joint forming an annular airspace between downstream end and the inner surface of the upstream transitional joint; and
   a seal disposed between each pair of adjacent conduit sections to substantially prevent the escape of air from the duct assembly, including an outermost seal disposed between the outermost conduit section and the conduit section adjacent the outermost conduit section, the outermost seal positioned opposite the annular airspace when the conduit sections are retracted; and
   at least one flow facilitating member, operably disposed on at least one of the conduit sections, for prompting the conducting of air from at least one of the conduit sections to a desired successive one of the conduit sections,
   the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

6. The duct assembly in accordance with claim 5 wherein the cross-section of the inner channel downstream end is of substantially the same size and shape as the cross-section of the innermost conduit section.

7. The duct assembly in accordance with claim 6 wherein the inner channel's downstream end is aligned with the innermost conduit section to form a substantially smooth surface when the conduit sections are retracted.

8. The duct assembly in accordance with claim 5 further comprising an upstream slide bearing and a spaced-apart downstream slide bearing disposed between each pair of adjacent conduit sections, one slide bearing located on each side of the seal.

9. The duct assembly in accordance with claim 8 wherein the seal is located adjacent the upstream slide bearing.

10. A duct assembly for conducting air from component to a component that is movable with respect to the fixed component movable along with the movable component comprising:
   at least two telescoping, tubular conduit sections, including an innermost conduit section and an outermost conduit section, movable between an extended position and a retracted position each conduit section having an inner surface and an outer surface;

an upstream transitional joint forming a substantially gas-tight seal with the outermost conduit section and movably interconnecting the outermost conduit section with a means for supplying air;

a downstream transitional joint forming a substantially gas-tight seal with the innermost conduit section and movably interconnecting the innermost conduit section with a means for delivering air;

a tubular double-wall spaced apart from the inner surface of the innermost conduit section, the tubular double-wall forming a first annular airspace between the tubular double-wall and the inner surface of the innermost conduit section;

an inner channel having an upstream end and a downstream end, the downstream end spaced apart from the inner surface of the upstream transitional joint forming a second annular airspace between the downstream end and the inner surface of the upstream transitional joint; and a seal disposed between each pair of adjacent conduit sections to substantially prevent the escape of air from the duct assembly, including an innermost seal disposed between the innermost conduit section and the conduit section adjacent the innermost conduit section, the innermost end positioned opposite the first annular airspace, an outermost seal disposed between the outermost conduit section and the conduit section adjacent the outermost conduit section, the outermost seal positioned opposite the second annular airspace when the conduit sections are retracted; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

11. The duct assembly in accordance with claim 10 wherein the tubular double-wall extends substantially the entire length of the innermost conduit section.

12. The duct assembly in accordance with claim 10 further comprising an upstream slide bearing and a spaced-apart downstream slide bearing disposed between each pair of adjacent conduit sections, one slide bearing located on each side of the seal.

13. The duct assembly in accordance with claim 12 wherein the seal is positioned adjacent the upstream slide bearing.

14. A duct assembly for interconnecting a fixed portion of an aircraft wing to a movable flight control element movable between a retracted position and an extended position with respect to the fixed portion comprising:

at least two telescoping, tubular conduit sections, including an innermost conduit section and an outermost conduit section, for conducting air from an air supply duct, through the conduit sections, and into an air spray duct, each conduit section having an Inner surface and an outer surface;

a tubular double-wall spaced apart from the inner surface of the innermost conduit section, the tubular double-wall forming an annular airspace between the tubular double-wall and the inner surface of the innermost conduit section; and a seal disposed between each pair of adjacent conduit sections, to substantially prevent the escape of air from the duct assembly, including an innermost seal disposed between the innermost conduit section, the innermost seal positioned opposite the annular airspace; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

15. The duct assembly in accordance with claim 14 wherein the tubular double-wall extends substantially the entire length of the innermost conduit section.

16. The duct assembly in accordance with claim 14 further comprising an upstream slide bearing and a spaced-apart downstream slide bearing disposed between each pair of adjacent conduit sections, one slide bearing located on each side of the seal.

17. The duct assembly in accordance with claim 16 wherein the seal is positioned adjacent the upstream slide bearing.

18. A duct assembly for interconnecting a fixed portion of an aircraft wing to a movable flight control element movable between a retracted position and an extended position with respect to the fixed portion comprising:

at least two telescoping, tubular conduit sections, including an innermost conduit section and an outermost conduit section, movable between an extended position and a retracted position each conduit section having an inner surface and an outer surface;

an upstream transitional joint forming a substantially gas-tight seal with the outermost conduit section and movably connecting the outermost conduit section with an air supply duct;

a downstream transitional joint forming a substantially gas-tight seal with the innermost conduit section and movably interconnecting the innermost conduit section with an air spray duct;

an inner channel having an upstream end and a downstream end, the downstream end spaced apart from the inner surface of the upstream transitional joint forming an annular airspace between the inner channel and the inner surface of the upstream transitional joint; and a seal disposed between each pair of adjacent conduit sections to substantially prevent the escape of air from the duct assembly, including an outermost seal disposed between the outermost conduit section and the conduit section adjacent the outermost conduit section positioned opposite the annular airspace when the conduit sections are retracted; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

19. The duct assembly in accordance with claim 18 wherein the cross-section of the inner channel's downstream end is of substantially the same size and shape as the cross-section of the innermost conduit section.

20. The duct assembly in accordance with claim 19 wherein the inner channel's downstream end is aligned with the innermost conduit section to form a substantially smooth surface when the conduit sections are in the retracted position.

21. The duct assembly in accordance with claims 18 further comprising an upstream slide bearing and a spaced-apart downstream slide bearing disposed between each pair of adjacent conduit sections, one slide bearing located on each side of the seal.

22. The duct assembly in accordance with claim 21 wherein the seal is positioned adjacent the upstream slide bearing.

23. A duct assembly for interconnecting a fixed portion of an aircraft wing to a movable flight control element movable between a retracted position and an extended position with respect to the fixed portion comprising:

at least two telescoping, tubular conduit sections, including an innermost conduit section and an outermost conduit section, movable between an extended position and a retracted position, each conduit section having an inner surface and an outer surface;

an upstream transitional joint forming a substantially gas-tight seal with the outermost conduit section and movably interconnecting the outermost conduit section with an air supply duct;

a downstream transitional joint forming a substantially gas-tight seal with the innermost conduit section and movably interconnecting the innermost conduit section with an air spray duct;

a tubular double-wall spaced apart from the inner surface of the innermost conduit section, the tubular double-wall forming an annular airspace between the tubular double-wall and the inner surface of the innermost conduit section;

an inner channel having an upstream end and a downstream end, the downstream end spaced apart from the inner surface of the upstream transitional joint forming a second annular airspace between the inner channel and the inner surface of the upstream transitional joint; and a seal disposed between each pair of adjacent conduit sections to substantially prevent the escape of air from the duct assembly, including an innermost seal disposed between the innermost conduit section and the conduit section adjacent the innermost conduit section, the innermost seal positioned opposite the first annular airspace and an outermost seal disposed between the outermost conduit section and the conduit section adjacent the outermost conduit section, the outermost seal positioned opposite the annular airspace when the conduit sections are in the retracted position; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having and an upstream region having a first circumference, a downstream region having a second circumference less than the first circumference, and a region therebetween having decreasing circumference, so as to taper gradually from the upstream region to the downstream region.

24. The duct assembly in accordance with claim 23 wherein the tubular double-wall extends substantially the entire length of the innermost conduit section.

25. The duct assembly in accordance with claim 23 further comprising an upstream slide bearing and a spaced-apart downstream slide bearing disposed between each pair of adjacent conduit sections, one side bearing located on each side of the seal.

26. The duct assembly in accordance with claim 25 wherein the seal is positioned adjacent the upstream slide bearing.

* * * * *

UNITED STATES PATENT AND TRADEMARK OFFICE
CERTIFICATE OF CORRECTION

PATENT NO. : 6,003,814
DATED : December 21, 1999
INVENTOR(S) : Pike et al.

It is certified that error appears in the above-identified patent and that said Letters Patent is hereby corrected as shown below:

Column 4,
Line 17, insert "-" between "pressure" and "energized"

Column 6,
Line 62, after "from" insert -- a fixed --

Column 7,
Line 66, delete "Inner" and insert -- inner --

Column 9,
Line 17, delete "claims" and insert -- claim --

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,003,814
DATED : December 21, 1999
INVENTOR(S) : Pike et al.

It is certified that error appears in the above-identified patent and that said Letters Patent is hereby corrected as shown below:

Column 5,
Line 33, delete "conduction" and insert -- conducting --

Column 10,
Line 39, delete "side" and insert -- slide --

Signed and Sealed this

Tenth Day of August, 2004

JON W. DUDAS
*Acting Director of the United States Patent and Trademark Office*